US011882363B2

(12) United States Patent
Tsunoda

(10) Patent No.: US 11,882,363 B2
(45) Date of Patent: Jan. 23, 2024

(54) CONTROL APPARATUS AND LEARNING APPARATUS AND CONTROL METHOD

(71) Applicant: CANON KABUSHIKI KAISHA, Tokyo (JP)

(72) Inventor: Takamasa Tsunoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 17/487,155

(22) Filed: Sep. 28, 2021

(65) Prior Publication Data

US 2022/0109795 A1 Apr. 7, 2022

(30) Foreign Application Priority Data

Oct. 5, 2020 (JP) ................................. 2020-168658

(51) Int. Cl.
*H04N 23/695* (2023.01)
*G06N 3/08* (2023.01)
*H04N 23/61* (2023.01)
*H04N 23/69* (2023.01)

(52) U.S. Cl.
CPC ............ *H04N 23/695* (2023.01); *G06N 3/08* (2013.01); *H04N 23/61* (2023.01); *H04N 23/69* (2023.01)

(58) Field of Classification Search
CPC ...... H04N 23/695; H04N 23/61; H04N 23/69; H04N 23/662; H04N 23/90; G06N 3/08; G06N 3/006; G06N 3/045; G06N 7/01; G06V 20/52; G06V 20/42
See application file for complete search history.

(56) References Cited

U.S. PATENT DOCUMENTS 10,262,692 B2 4/2019 Tamir et al.
2022/0174258 A1* 6/2022 Nishida ................. H04N 5/772
2022/0353484 A1* 11/2022 Miyata ................. H04N 21/258

FOREIGN PATENT DOCUMENTS

JP H09-322051 A 12/1997
JP 3615867 B2 2/2005
WO WO-2021095961 A1 * 5/2021

OTHER PUBLICATIONS

English translation of Matsushita et al., "Computer Vision Advanced Guide 5," Google, Inc (2012), pp. 32-71.
Joseph Redmon, et al., "YOLO9000: Better, Faster, Stronger," Proceedings of the IEEE Conference on Computer Vision and Pattern Recognition CVPR (2017), pp. 7263-7271.
Matsushita et al., "Computer Vision Advanced Guide 5," Google, Inc (2012), pp. 32-71.
Volodymyr Mnih, et al., "Asynchronous Methods for Deep Reinforcement Learning," ICML2016, Proceedings of the 33rd International Conference on Machine Learning, JMLR: W&CP, vol. 48 (2016), pp. 1-10.

* cited by examiner

*Primary Examiner* — Tat C Chio
(74) *Attorney, Agent, or Firm* — Venable LLP

(57) ABSTRACT

A control apparatus controls one or more image capturing units. The apparatus comprises: an obtaining unit configured to, based on an image of a plurality of objects captured by the image capturing units, obtain positions of the plurality of objects; and a generation unit configured to, based on at least the image, the positions of the plurality of objects and the orientation of the image capturing units, generate a control command for changing the orientation of the image capturing units.

10 Claims, 11 Drawing Sheets

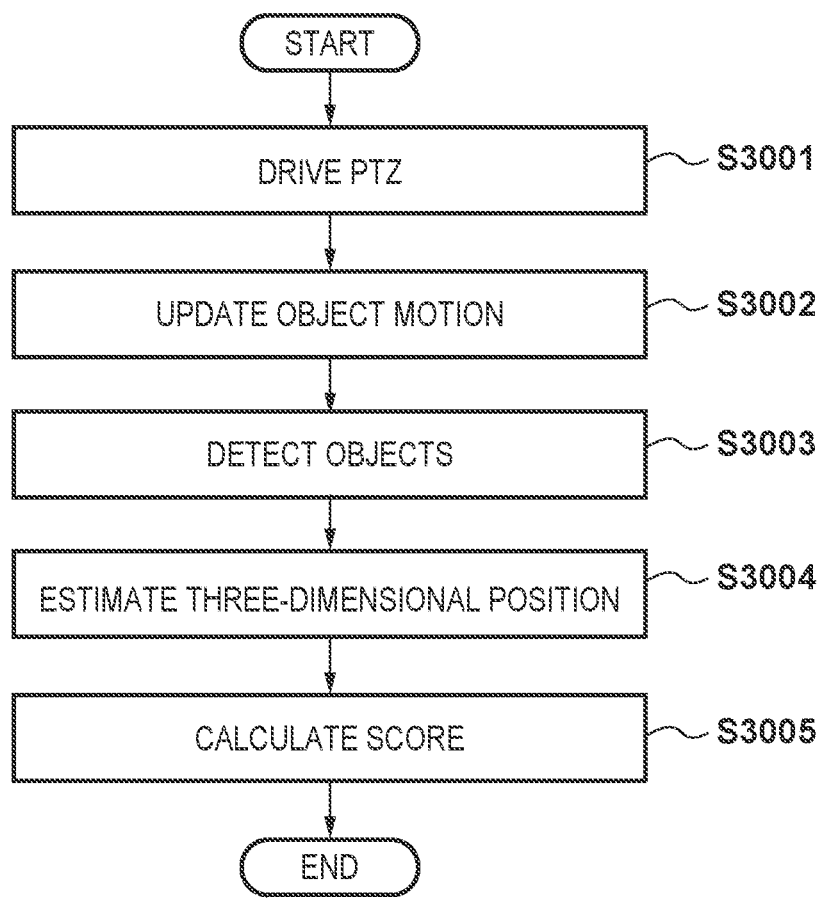

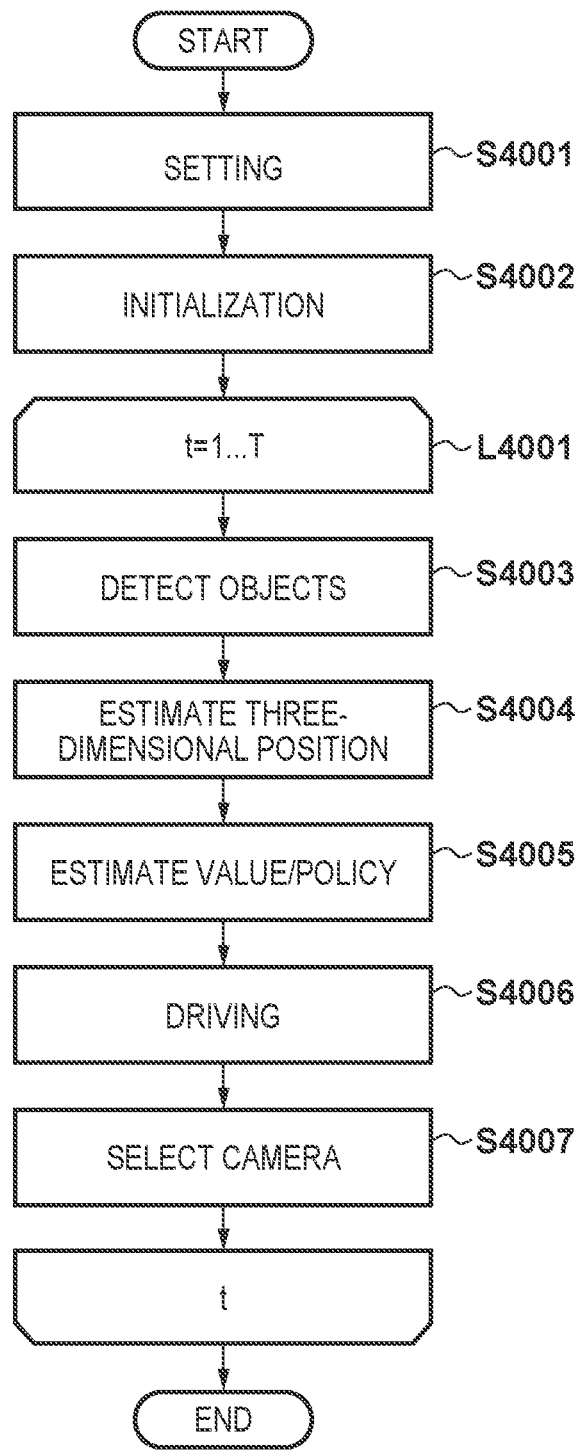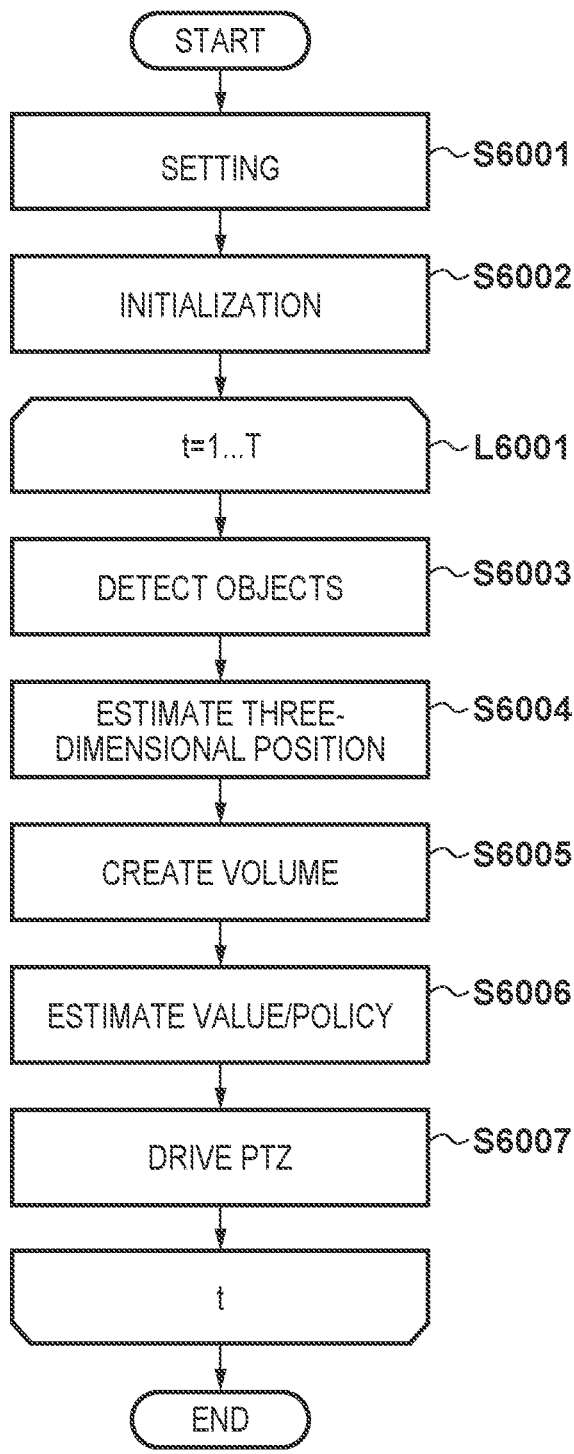

CONTROL APPARATUS AND LEARNING APPARATUS AND CONTROL METHOD

BACKGROUND OF THE INVENTION

Field of the Invention

The present invention relates to a technique for capturing a subject.

Description of the Related Art

There has been proposed an automatic capturing technique for capturing events such as sports and realizing distribution of videos at a low cost. Many of these technologies realize automatic capturing by obtaining the subject position in a field where an event takes place and controlling a camera for capturing based on the obtained subject position.

Japanese Patent No. 3615867 describes an image capturing apparatus for realizing automatic capturing by controlling a camera for capturing based on a subject position estimated by a three-dimensional position estimation. U.S. Pat. No. 10,262,692 describes a control apparatus for synthesizing a panoramic image covering the entire field from a multi-eye camera, controlling a virtual camera based on an object position detected in the panoramic image, and obtaining a moving image for distribution by cutting out the image.

However, in the conventional technique described above, it is necessary to obtain the position of a subject for the entire field. As a result, a large number of redundant image regions and cameras which will not be used are required, which is an obstacle in constructing a low-cost automatic capturing system.

SUMMARY OF THE INVENTION

According to one aspect of the present invention, there is provided a control apparatus that controls one or more image capturing units, the apparatus comprising: an obtaining unit configured to, based on an image of a plurality of objects captured by the image capturing units, obtain positions of the plurality of objects; and a generation unit configured to, based on at least the image, the positions of the plurality of objects and the orientation of the image capturing units, generate a control command for changing the orientation of the image capturing units.

According to another aspect of the present invention, there is provided a learning apparatus that learns a weighting parameter of a learning model that outputs control information for changing an orientation of an image capturing unit, the apparatus comprising: an output unit configured to output the control information by inputting the orientation of one or more image capturing units for capturing a plurality of objects and an image in which the plurality of objects were captured to the learning model to which a given weighting parameter was applied; and a learning unit configured to give a score estimated based on the orientation of the image capturing units controlled by the control information and an image in which the plurality of objects were captured by the image capturing units as a reward and learn the weighting parameter for outputting the control information in which the reward is maximized.

The present invention makes it possible to capture a subject more preferably using one or more cameras.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A to FIG. 3C are flowcharts illustrating processing performed by the control apparatus or a learning apparatus.

FIG. 8A and FIG. 8B are flowcharts illustrating processing that the control apparatus are executes.

DESCRIPTION OF THE EMBODIMENTS

Figure 1A:
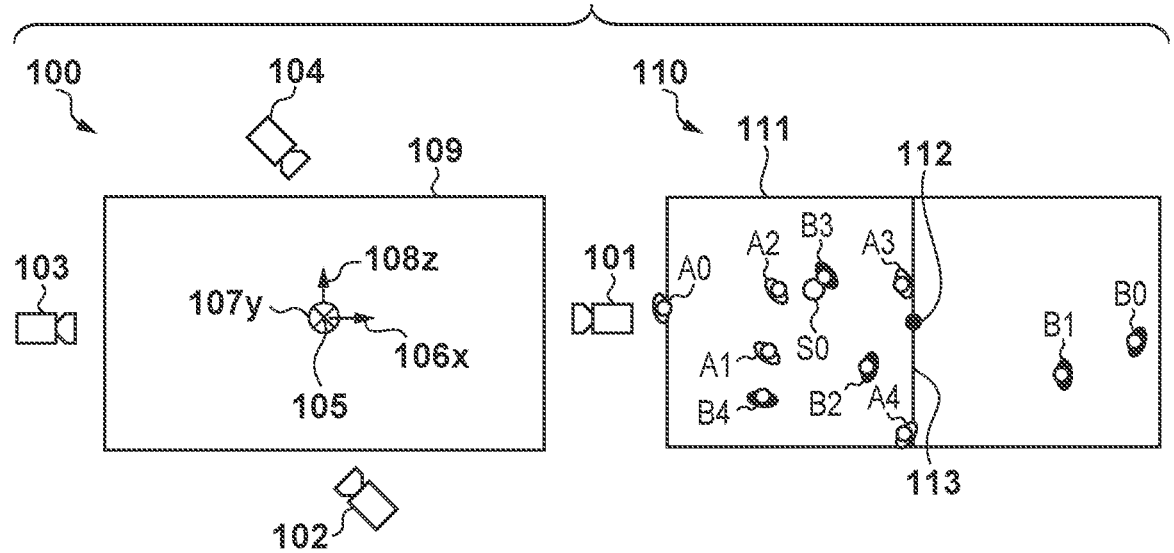
FIG. 1A and FIG. 1B are views illustrating examples of positioning of cameras and people and examples of viewpoint images.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As a first embodiment of a control apparatus and a learning apparatus according to the present invention, a system for controlling a pan, tilt, and zoom (PTZ) video camera and automatically capturing a subject so as to satisfy set image capturing conditions is described below as an example.

<System Configuration>

In the first embodiment, as a specific example, a plurality of fixed PTZ video cameras are installed around a pitch for futsal, which is a ball sport, and these cameras are controlled. Thus, a description is given of a mode in which tracking of a ball and a person within a pitch and a tracking capture of a ball or a person nearest to the ball are simultaneously/concurrently realized.

Figure 1B:
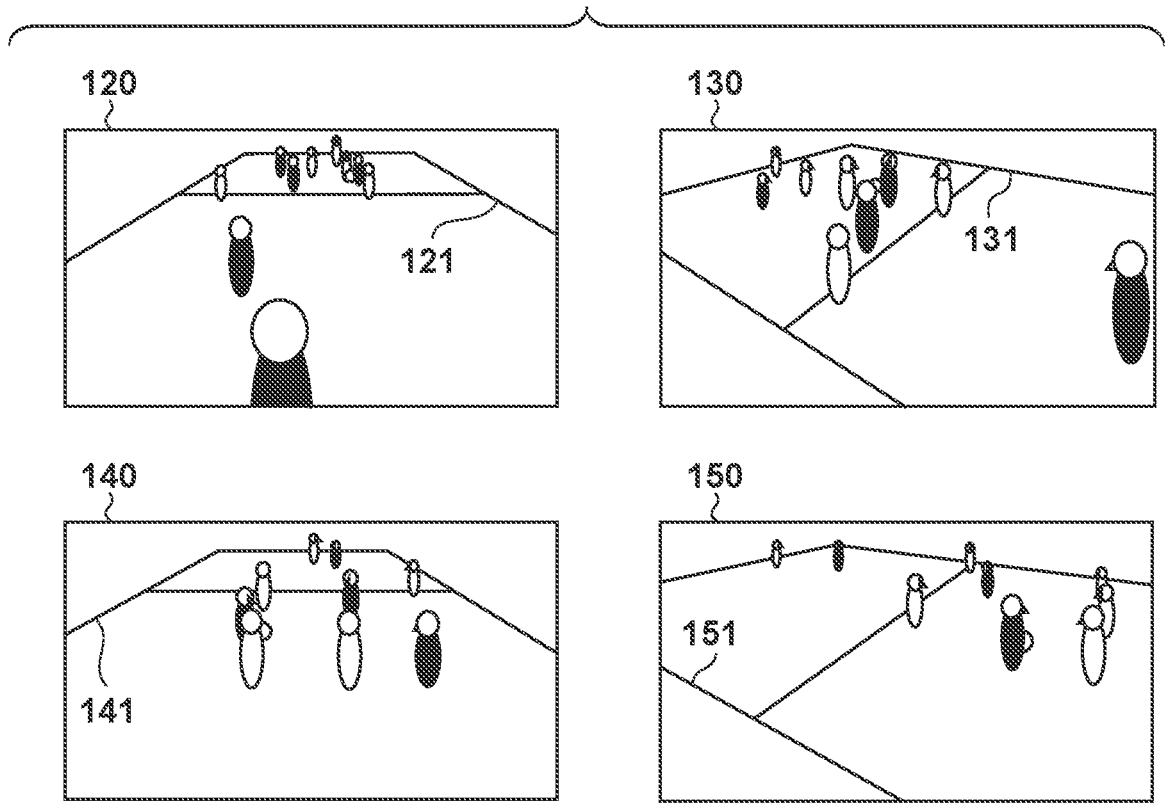

FIG. 1A is a view illustrating an example of positioning of cameras and people according to the first embodiment. FIG. 1B is a view illustrating examples of viewpoint images in the arrangement of the FIG. 1A.

A camera arrangement 100 illustrates placement of cameras 101 to 104. The cameras 101 to 104 are fixedly installed PTZ cameras that can be driven to pan, tilt, and zoom by external commands. An origin 105 is the origin of the three-dimensional space. Arrows 106x, 107y, and 108z, respectively, represent the X-axis, Y-axis, Z-axis based on the origin 105 in three-dimensional coordinates (world coordinates). Incidentally, a plane formed by the X-axis and Z-axis corresponds to the ground, and the Y-axis is the vertical direction. A rectangle 109 is an outer periphery of a futsal pitch (a rectangle formed by the touch line and the goal line). Each camera is fixed to a space wall surface portion of a certain height from the ground, and is installed so as to capture objects existing on the pitch.

A person positioning 110 shows the positions of people (players) and a ball at a certain time. A rectangle 111 corresponds to the same pitch as the rectangle 109. A center mark 112 and a halfway line 113 are arranged on the pitch. As players, team A players A0-A4 and team B players B0-B4 are shown separately. The ball S0 is also shown.

The images 120, 130, 140, and 150 respectively show the person/ball arrangement shown in the person arrangement 110 and the images captured by the cameras 101, 102, 103, and 104 shown in the camera arrangement 100. The pitches 121, 131, 141, and 151 are pitches indicated by rectangles 109. As the images of each viewpoint show, the sizes of the one or more subjects that are hidden or visible changes according to the position of the camera and the plurality of subjects. Also, the size of what is visible can be changed by changing the zoom of the camera. Further, by driving the pan/tilt of the cameras, the orientation can be changed and the field of view (FOV) can be changed.

<Apparatus Configuration>

Figure 13:
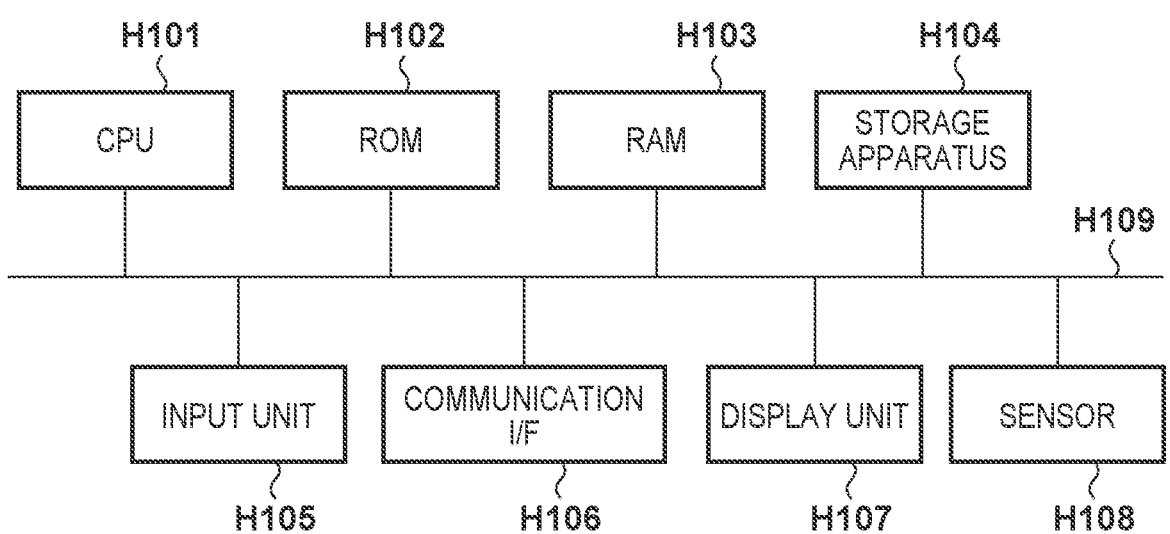
FIG. 13 is a block diagram illustrating a hardware configuration example of the control apparatus.

FIG. 13 is a block diagram illustrating an example of a hardware configuration of the control apparatus and the learning apparatus. A central processing unit (CPU) H101 reads and executes an OS or other programs stored in a ROM H102 and a storage apparatus H104 using a RAM H103 as a work memory, and controls the respective configurations connected to a system bus H109 to perform calculations of various processes, logical determinations, or the like. A process performed by the CPU H101 includes information processing of the embodiment. The storage apparatus H104 is a hard disk drive, an external storage apparatus, or the like, and stores programs and various data related to the information processing of the embodiment. An input unit H105 is an input device such as a button, a keyboard, or a touch panel for inputting user instructions to an image capturing apparatus such as a camera. Note, the storage apparatus H104 is connected to the system bus H109 via an interface such as an SATA, and the input unit H105 is connected to the system bus H109 via a serial bus such as a USB, but a detailed description thereof will be omitted. A communication I/F H106 communicates with external devices by radio communication. A display unit H107 is a display. A sensor H108 is an image sensor or a range sensor.

Figure 2A:
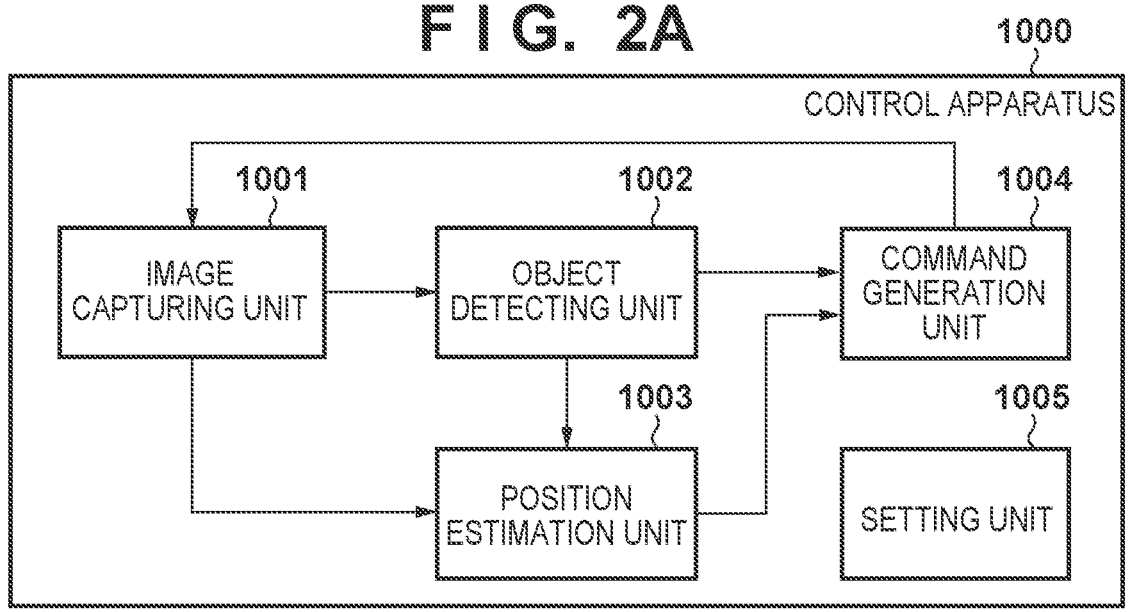
FIG. 2A and FIG. 2B are block diagrams illustrating a functional configuration example of a control apparatus.
Figure 2B:
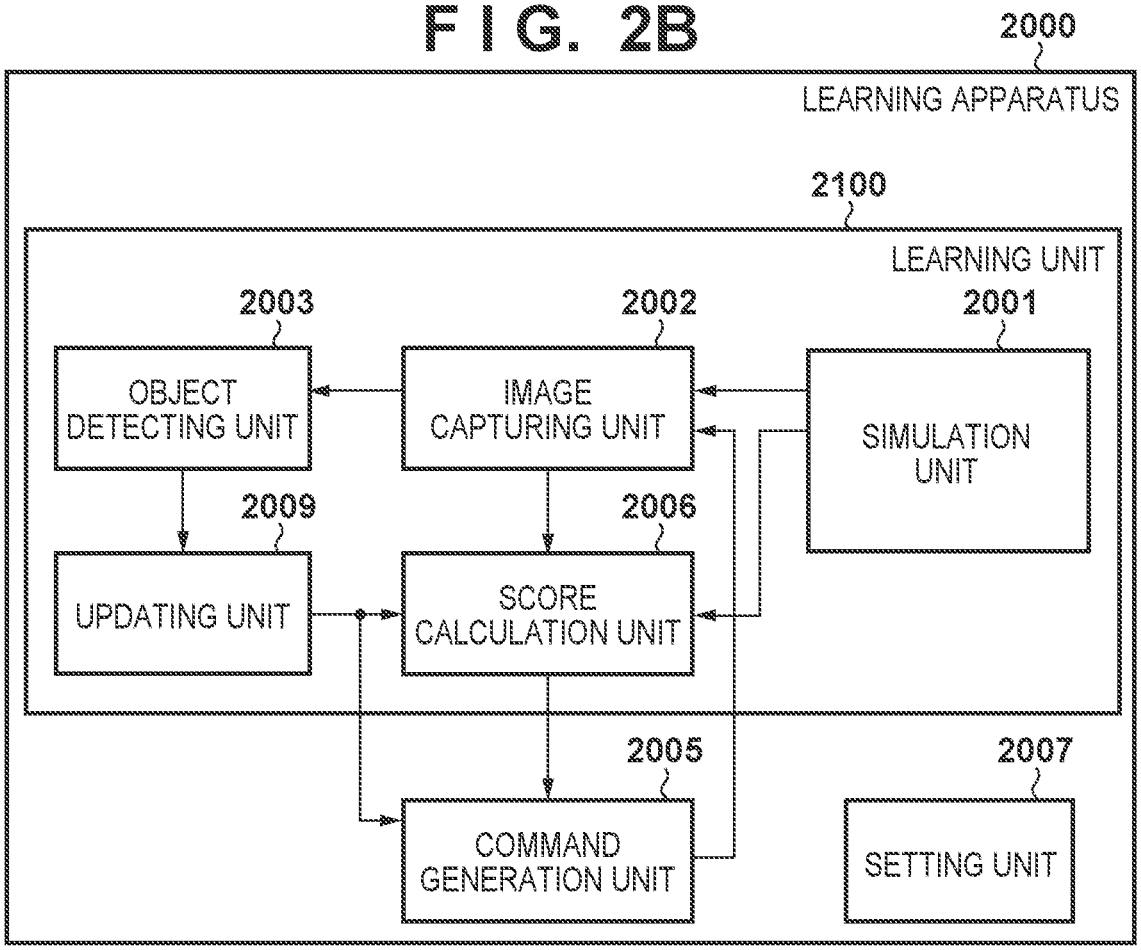

FIG. 2A is a view illustrating a functional configuration of an apparatus (a control apparatus 1000) in runtime. Runtime refers to the state in which automatic capturing (tracking capture and tracking) is operated by the cameras 101 to 104. FIG. 2B is a view illustrating a functional configuration of an apparatus (a learning apparatus 2000) at a time of learning. Note, although the control apparatus 1000 and the learning apparatus 2000 are shown as separate configurations, they may be integrated.

An imaging unit 1001 corresponds to cameras 101 to 104 that are PTZ cameras having a drive mechanism including a pan mechanism, a tilt mechanism, and a zoom mechanism. The imaging unit 1001, by performing the drive control for driving the drive mechanism (PTZ mechanism), can realize a PTZ operation. Furthermore, the cameras 101 to 104 also have a function of cutting out an image of a predetermined region from an image (a wide-angle image) captured by controlling the zoom magnification more to a wide-angle side than a predetermined magnification to thereby realize a PTZ operation in a pseudo manner. The control apparatus and the PTZ camera (image capturing apparatus) may be separate apparatuses. The control apparatus controls the orientation of at least a plurality of PTZ cameras, and performs tracking of the subject and image capturing instruction for each camera.

The control apparatus 1000 includes an imaging unit 1001, an object detecting unit 1002, a position estimation unit 1003, a command generation unit 1004, a setting unit 1005. Note, although each functional unit is shown to be a single unit, a plurality of functional units may be provided. For example, the imaging unit 1001 corresponds to the cameras 101 to 104 in the FIG. 1A. The learning apparatus 2000 includes a learning unit 2100, a command generation unit 2005, and a setting unit 2007. The learning unit 2100 includes a simulation unit 2001, an image capturing unit 2002, an object detecting unit 2003, an updating unit 2009, and a score calculation unit 2006. Note, although each functional unit is shown to be a single unit, a plurality of functional units may be provided. For example, the imaging unit 2002 is four simulation cameras corresponding to the positions of the cameras 101 to 104 in the learning unit 2100.

Although described in detail later, the learning apparatus 2000 performs reinforcement learning on a weight parameter of a learning model outputting control information for changing the orientation of the image capturing unit. The control apparatus 1000 applies a given weight parameter obtained by learning to a neural network, and generates a PTZ command, which is a control command based on the estimated position of the object, using the neural network.

<Apparatus Operation>
<Runtime Processing>

Figure 3A:
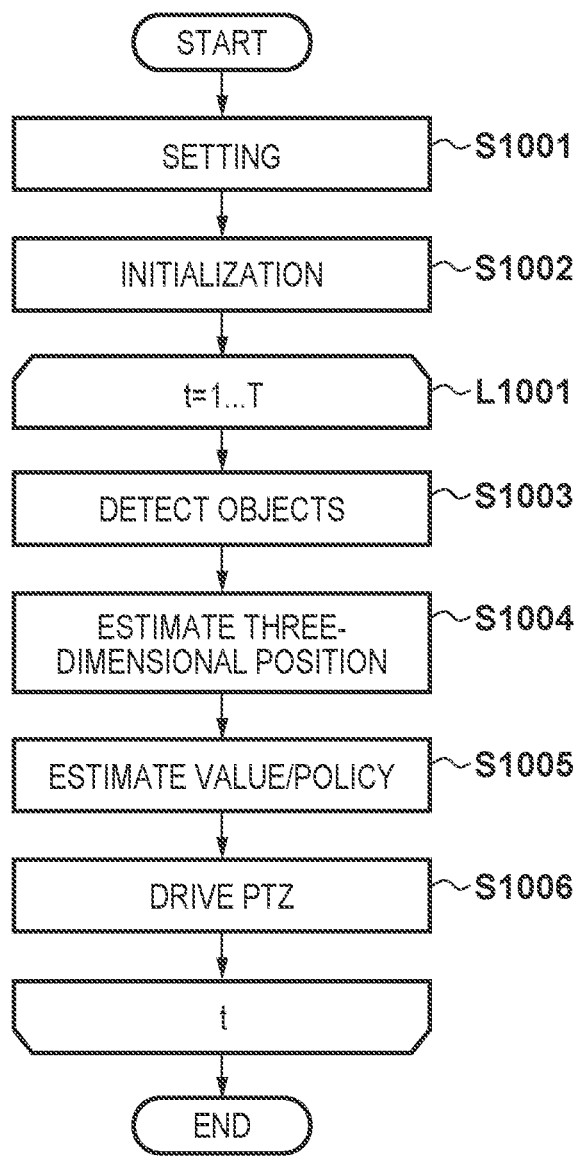

FIG. 3A is a flow chart showing a runtime process in the first embodiment.

In step S1001, the setting unit 1005 sets the target object to perform tracking capture and tracking. For example, the user operates a graphical user interface (GUI) (not shown) to input a target object to be tracking captured and tracked to the setting unit 1005. Alternatively, a target object of a category specified in advance may be detected by image recognition and set as an image capturing target.

Here, in the setting of the target of the tracking capture, one of the ball and the people is set as the target of the tracking capture. Next, targets to be tracked are set. The detection targets of the object detecting unit 1002 used in step S1003, described later, are candidates, and are the heads of the people and the ball. One or a plurality are selected therefrom. The target set as the tracking capture target is also assumed to be set as a tracking target. Alternatively, in the case where a referee exists in addition to the players and the ball on the pitch, the players, the ball, and the referee become tracking candidates in a case where the object detecting unit 1002 can detect them by distinguishing them.

Details of the object detecting unit 1002 are described in detail in step S1003. An ID is assigned to each of the tracking capture and tracking target candidate instances, and it is assumed that the tracking capture and tracking target targets set here can be specified using IDs.

In step S1002, the command generation unit 1004 performs PTZ driving of the imaging unit 1001 (the cameras 101 to 104) to bring it into an initial state. Also, a weighting parameter corresponding to the tracking capture target and the tracking targets set in step S1001 is loaded into the neural network used in step S1003 and step S1005 described later. Since the initialization step is performed at the start of capturing and tracking, it is usually performed at the start of the game.

A loop L1001 is a time related loop, and it is assumed that one loop is executed at a speed of a framerate of about 30 to 60 FPS. However, one loop is determined by the total throughput of each step in the loop, and may be slower depending on the runtime environment. In this case, for the image capturing, images are captured at the normal video rate (about 30 to 60 FPS), the images according to the frame rate of the loop are sampled, and each step within the loop is executed. Also, this loop is repeatedly executed until the end of tracking capture and tracking.

In step S1003, the object detecting unit 1002 resizes the image obtained by the imaging unit 1001 to an appropriate size and executes the detection process using the object detector. The object detector is assumed to be an object detector using the convolution networks disclosed in "Joseph Redmon, Ali, Farhadi, 'YOLO9000: Better, Faster, Stronger', CVPR2017". This object detector outputs, for as many that exist in the input image, pre-learned bounding boxes (coordinates and widths) and a reliability of objects in the detection target categories.

Here, regarding the detection target categories, it is assumed that the ball and people (head or whole body) are to be detected. In a case where there is a difference or the like in appearance between the players and the referee due to a difference in clothes, configuration may be taken such that the learning apparatus 2000 may learn the player and the referee as different categories in advance, and the control apparatus 1000 may detect each by using a weight parameter obtained by the learning.

In step S1004, the position estimation unit 1003 performs three-dimensional position estimation using a known technique based on the object detection result of each camera obtained in step S1003 and the camera parameters of each camera. For example, the multi-view stereo technology described in "Matsushita, Furukawa, Kawasaki, Furukawa, Sagawa, Yagi, Saito, Computer Vision Advanced Guide 5 (2012)" can be used.

Further, by assigning IDs based on consistency between the three-dimensional position estimation result of the previous frame and the three-dimensional position estimation result of the current frame, three-dimensional tracking is performed. For the allocation of IDs, a known combinatorial optimization technique for solving the assignment problem, such as a Hungarian method for realizing an assignment in which the sum of costs is minimized with the Euclidean distance or the like as a cost is used. This ID is further assigned to the ID of the tracking capture target set in step S1004. As a result, the ID of the tracking target is assigned to the detection result obtained in step S1003.

In step S1005, the command generation unit 1004 applies the weight parameter learned by the reinforcement learning to the neural network, and generates a PTZ command using the neural network.

Figure 4A:
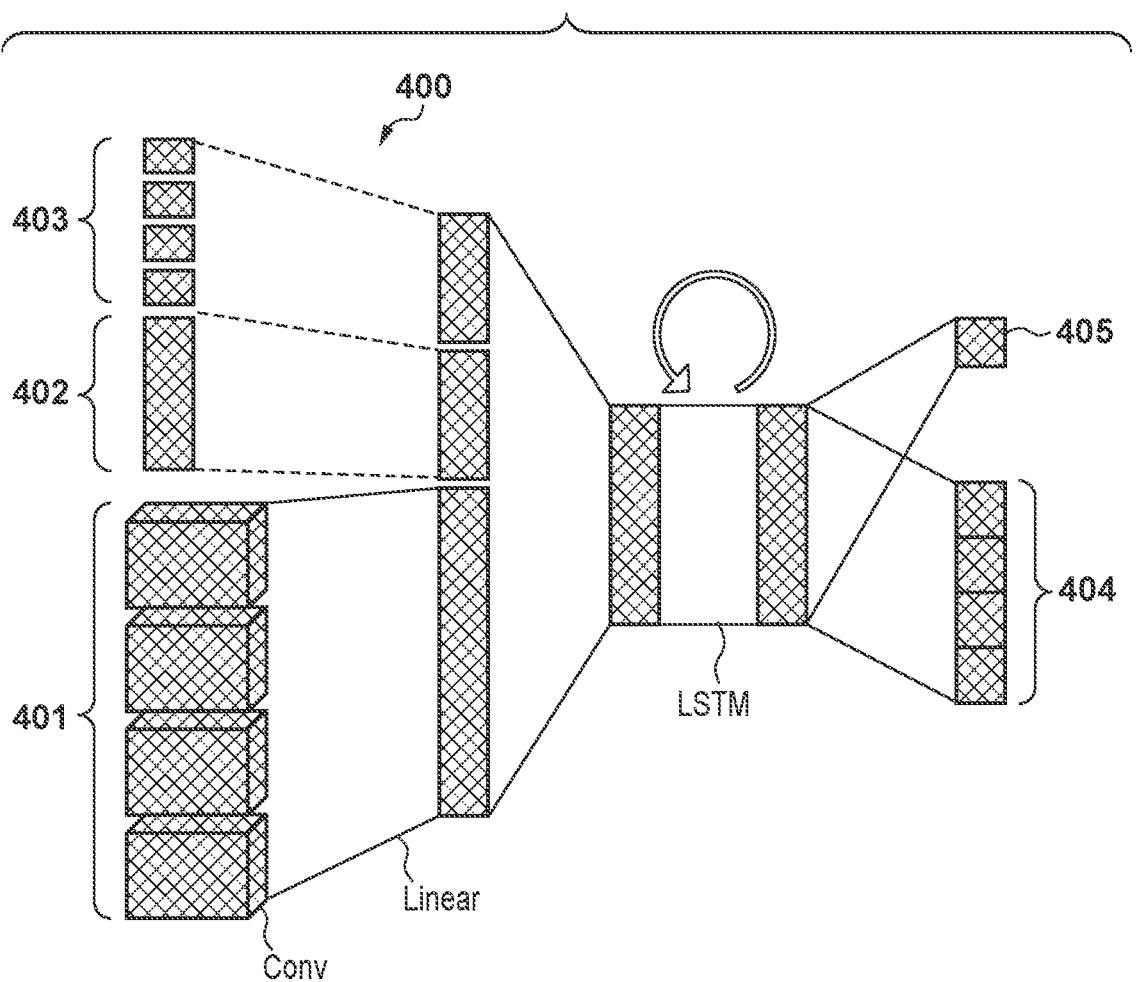
FIG. 4A and FIG. 4B are views illustrating a configuration example of a learning model.

FIG. 4A is a view illustrating a configuration of a four-camera-input Actor-Critic network 400 (learning model). An image 401, a three-dimensional position 402 of the tracking capture and tracking target (ball and players), the camera orientation, and a state 403 of pan, tilt, and zoom are inputted to the network 400. Meanwhile, a policy output 404 and a value output 405 are outputted from the network 400.

Figure 4B:
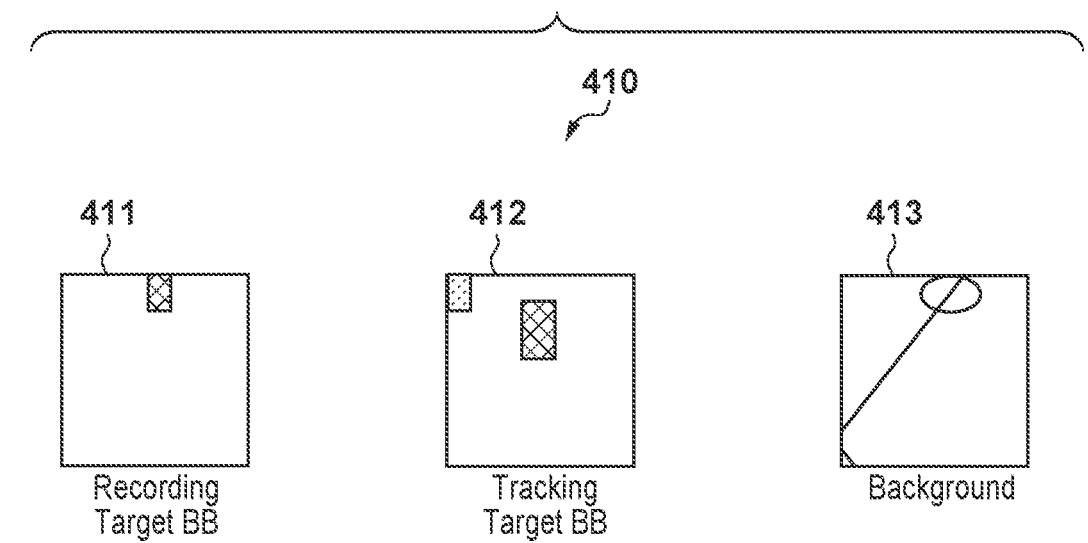

The image 401 is assumed to be a three-channel image as shown in an input image 410 of FIG. 4B. Specifically, bounding box (BB) images 411 and 412 and a background image 413 are obtained as a result of the object detection in step S1003. Note, the BB image 411 is a BB image of the tracking capture target and the BB image 412 is a BB image of the other tracking target. Incidentally, the BB image is obtained by imaging brightness values as a detection reliability, and the background image 413 is a binarized image. Also, four viewpoint images from the four cameras 101 to 104 are inputted to the network 400 as an image 401. The orientation of the four cameras (pan, tilt, and zoom control states) is also inputted for the state 403.

A policy output 404 corresponds to the command of the PTZ camera.

In general, PTZ cameras can set multiple stages of speed for PTZ driving. In the simplest case of controlling PTZ, it is also possible to use three types of discrete commands of $\{-1, 0, 1\}$ with a speed of one step, but in this case, the movement of the PTZ is not smooth, and it is not preferable as an image used for viewing and for object detection. Therefore, in this case, as the policy output 404, a command of continuous values of $[-1,1]$ is generated so that fine motion can be performed. This continuous value command is quantized to a predetermined gradation, and the speed setting of multiple stages is carried out by inputting the numerical value into the PTZ camera.

The PTZ camera has a predetermined driving range for pan, tilt, and zoom. Within a predetermined driving range of the PTZ camera, the PTZ command does not change the state if it is 0 and changes the driving speed state by only one step in the positive direction if it is greater than 0 or one step in the negative direction if it is less than 0.

Furthermore, in FIG. 4A, although the policy output 404 is shown as a configuration in which a command for four cameras is outputted, configuration may be taken such that a command for one camera is outputted. In other words, a multi-agent configuration, in which a number of Actor-Critic networks proportional to the number of cameras is prepared, may be employed.

The value output 405 outputs a value corresponding to the command of the policy output 404, but this output is not used in the processing at the runtime. Note that, although a mode in which networks that are subjected to reinforcement learning by the Actor-Critic method are used is described here, another reinforcement learning method such as Q-learning may be applied.

In step S1006, the command generation unit 1004 transmits the PTZ command generated in step S1005 to the imaging units 1001 (cameras 101 to 104) and executes PTZ driving of the cameras.

The PTZ driving is performed within a predetermined driving range of the PTZ camera as described above. For example, the pan angle range is ±170°, the tilt angle range is −90° to +10° (assuming the horizontal direction is 0°), and the zoom (focal length) is 4.7 mm to 94 mm. For example, if the state of the camera pan is +170° at the end of this driving range, the next pan command will not drive any more in the positive direction, even if it is +X (□0).

<Processing During Learning>

Figure 3B:
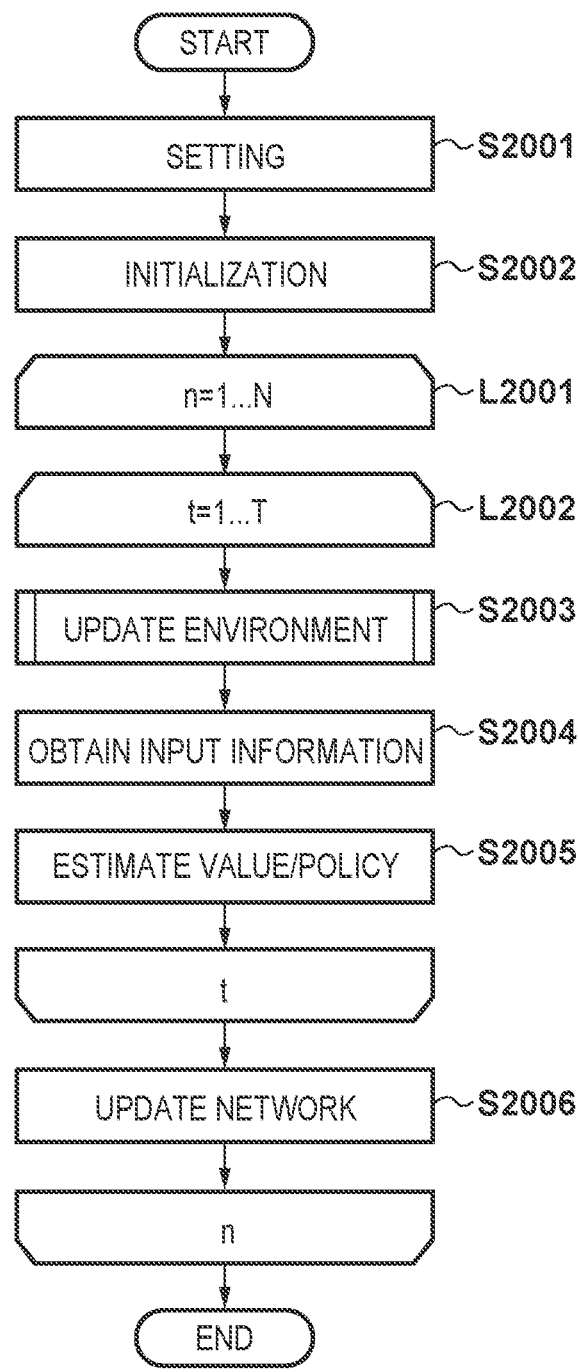

FIG. 3B and FIG. 3C are flow charts showing a runtime process at a time of learning in the first embodiment. At the time of learning, a virtual environment in which the cameras, the pitch, the people, and the ball described in FIG. 1A and FIG. 1B are arranged is constructed, and a futsal game is performed in the virtual environment. Camera control is performed for the game, the control result is scored, the result is given to the network as a reward, and thereby performing reinforcement learning of the network. Preferably, the weighting parameter for outputting camera control that maximizes the reward (score) is learned. At this time, the units for a single futsal game to be learned are called episodes.

In step S2001, the setting unit 2007 performs tracking capture target setting. The learning is performed for all targets of the tracking capture and tracking that can be selected in the runtime processing. Therefore, in this step, when there are a plurality of choices for tracking and tracking targets in the runtime processing, the choices are set sequentially and processing is performed multiple times hereinafter.

In addition, in this step, a parameter for determining the behavior of the tracking capture, which is used in step S3005 described later, may be set. The parameters are, for example, parameters that determine the distance from the center of the image of the tracking capture target or are the range of the size of the visible part of the tracking capture target.

In step S2002, the setting unit 2007 performs initialization processing. Here, each module of the learning unit 2100 is initialized. In addition, reinforcement learning of an Actor-Critic network used to generate PTZ commands is performed by synchronizing and learning a plurality of episodes. In this step, a plurality of simulation environments used at that time are instantiated.

A loop L2001 is a loop relating to episodes. In this loop, as described above, since a plurality of episodes are actually executed synchronously, learning processing related to the plurality of episodes is executed in parallel in one loop.

A loop L2002 is a time related loop, and is repeatedly executed from the beginning to the end of a game to be learned as one episode.

In step S2003, the learning unit 2100 updates the simulation environment. FIG. 3C illustrates a subroutine within an environment update step (step S2003). Each process of step S3001, step S3002, step S3003, step S3004, and step S3005 is in the subroutine.

In step S3001, the command generation unit 2005 generates a drive command for the imaging unit 2002. In the learning unit 2100, there are the four cameras 101 to 104 corresponding to FIG. 1A. The PTZ command obtained in step S2005 of the preceding loop is inputted to the camera on the virtual environment to drive the pan/tilt/zoom of the camera. Note, in the first time of the loop, zero is inputted and the PTZ is not driven.

In step S3002, the simulation unit 2001 predicts and updates the motion of the people and the ball in the virtual space. In the process at the time of learning, the people and the ball shown in the pitch 111 of the FIG. 1B are arranged in a virtual space, and a futsal simulation is performed in a duration corresponding to the frame rate of the moving image (about 60 FPS). In this step, the state of the next match is calculated for only one hour, and the state of each instance is updated.

In step S3003, the simulation unit 2001 simulates the object detection based on the state of the object detection targets in the virtual space updated in step S3002 and the camera state. Firstly, based on the position and speed of an object detection target (such as a ball or the head of a person) set in advance and the camera parameters, the speed, occlusion rate, and size of the visible part of the target in the pixel coordinates of each camera is calculated. Next, the estimation of the reliability is performed by using a multiple regression model in which the size of the appearance, the occlusion rate, and the speed are made to be explanatory variables, and the reliability of the object detection is made to be an objective variable. Here, the occlusion ratio is a ratio of an area in which a target is occluded by an object in front of the target.

This multiple regression model uses calibrated cameras and actual data of object detection of persons and balls in which three-dimensional positions are obtained, and learns and prepares in advance with the above explanatory variables and objective variables. The multiple regression model may be a polynomial model of any suitable order.

Further, based on the cases of success or failure of object detection of actual data, a range related to the size of appearance, occlusion rate, and speed of the object may be set to determine whether or not the object detection is possible. That is, if the size or speed of the object exceeds a predetermined range (for example, in a case where it is too small or too fast or the like), it is assumed that the object cannot be detected, and in such a case, the reliability is set to 0. Further, a probability model relating to false detection of the object detection (undetected, over-detected, or a detection position deviation) may also be created, and a simulation of the false detection (noise) may also be performed. At this time, the probability model driven by the random number simulates the occurrence of non-detection or over-detection, by providing a variation with respect to reliability and detection position by the probability model driven by the random number, to simulate false detection that may occur realistically.

Here, a method for simulating reliability by a multiple regression model learned using actual data of object detection reliability is described, but reliability may be calculated by a method without using a multiple regression model. Generally, the detection reliability is positively correlated with the size of the visible part of the target and negatively correlated with the occlusion rate and velocity, respectively. That is, the larger the target is, the relatively higher the reliability is, and the less occluded the information is, the higher the reliability is. A function capable of expressing these properties may be appropriately created, and the function may be used to calculate and use a value corresponding to the reliability from the size of visible part of the target, the occlusion rate, and the speed.

In step S3004, the object detecting unit 2003 performs the three-dimensional position estimation of the detection target using the object detection result simulated in step S3003. In this processing, it is assumed that three-dimensional tracking is performed on the simulated result of the object detection by the same method as the method described in step S1004 of the processing at the runtime.

In step S3005, the score calculation unit 2006 calculates the score of each of the tracking capture and tracking based on the state of the tracking capture target, the state of the tracking target, and the state of the camera.

Tracking Capture Score (First Standard)

In the tracking capture, the standard is made to be that it is sufficient that the tracking capture target can be placed in the center of the captured image as much as possible within the range in which the object detection is possible. Therefore, in a case where the target exists in the FOV of the camera, a value obtained by raising the cosine similarity of the vector from the camera center to the tracking target and the vector from the camera center to the screen center in the three-dimensional space to the power of an appropriate order is used as the score of the camera (Equation (1)).

$$r_1^{(k)} = \left(\max\left(\frac{\vec{a}\cdot\vec{b}}{|\vec{a}||\vec{b}|}, 0\right)\right)^l \quad (1)$$

Here, a is the vector from the camera center to the tracking target, b is the vector from the camera center to the screen center, and 1 is the order. The cosine similarity has a wide range near the maximum value, and as it is, the score does not change much depending on whether the target is in the center of the screen or on the periphery thereof, and it is good to employ a function that raises it to the power of about the order 4 and is steep in the vicinity of the maximum value. At this time, when the cosine similarity becomes zero or less, 0 is set. k is the camera number.

In addition, a score for the size of the visible part may be multiplied. For example, in a case where the range of the size of the visible part is set in step S2001, if the size of the visible part is within the range, a value close to 1 is taken, and if the size of the visible part is outside the range, a value close to 0 is taken, and a value normalized to [0, 1] is taken as a score, and the score is multiplied by $r_1^{(k)}$.

In addition, when the target exists outside the FOV of the camera, 0 is set because neither detection nor capturing can be performed (Equation (2)).

$$r_1^{(k)}=0 \quad (2)$$

Finally, the maximum value of the scores of all the cameras is taken, and the maximum value is taken as the score for the tracking capture (Equation (3)).

$$r_1 = \max_k r_1^{(k)} \quad (3)$$

Tracking Score (Second Standard)

In the first embodiment, the three-dimensional position is estimated in multi-view stereo, and the three-dimensional tracking is performed. Therefore, it is desirable that all tracking targets can be detected by two or more cameras at all times. In order to improve the detection accuracy, it is desirable to be able to perform detection in a state where the detection reliability is as high as possible. Therefore, in tracking, all targets are detected by two or more of the K cameras, and the standard is that the higher sum of the maximum value and the second largest detection reliability, the better. The score may be calculated based on a standard including at least one of the rate of occurrence of occlusion, the size of the target in the captured image, and the moving speed of the target.

This is represented as pseudo-program code as follows. Here, the obtained score $r_2$ is used as a tracking score.

```
Set N = number of targets
Declare r₂
For n = 1 to N do
  Declare accumulated_score
  Set num_detect = number of cameras detected target n
  If num_detect □ 2 then
    Set sorted_scores = sorted detection confidence array of target n
    Declare value
    For index = 1 to 2 do
      Value = value + sorted_scores[index]
    End do
```

```
    Accumulated_score = value
  Else
    accumulated_score = 0
  End If
  r₂ = r₂ + accumulated_score
End do
r₂ = r₂ / N
```

Here, num_detect is the number of cameras that detected a target n, and sorted_scores is the array of the detection reliability sorted in descending order of the target n (the number of elements is equal to the number of cameras).

Finally, the score of the tracking capture and the score of the tracking are averaged, and a score (integrated score) determined in a case where both the tracking capture and the tracking are executed is set (Equation (4)).

$$r_t=(r_1+r_2)/2 \quad (4)$$

Note that t is a subscript relating to time.

In step S2004, the command generation unit 2005 obtains the input information of the Actor-Critic network (FIG. 4A) used to generate the PTZ command from the simulation environment updated in step S2003. As already described in the description of the process at runtime, the Actor-Critic network used in the present embodiment is an image of each camera, a three-dimensional position of the target, an orientation of each camera, and the pan/tilt/zoom state. Therefore, the corresponding information is obtained from the updated simulation environment and inputted to the network. Here, the image of each camera, like the input image 410 shown in FIG. 4B described in the processing at runtime, is an image of a total of 3 channels, that is, 2 channels that image the BB and reliability of the tracking capture target and the tracking target, and 1 channel of the background image.

In step S2005, the command generation unit 2005 executes a forward propagating process of the Actor-Critic network, and obtains the PTZ commands of the respective cameras from the policy outputs of Actor-Critic network.

In step S2006, the updating unit 2009 updates the network. First, the output value of the value output of the forward propagation processed Actor-Critic network, the output value of the policy output, and the total scores of Equation (4) at the respective times of one episode executed in the loop L1001 are obtained. Then, according to the learning method of Actor-Critic network disclosed in the following Document 1 or the like, the gain and the value loss are calculated from the value output and the reward (integrated score), the policy loss is calculated from the policy output, and the network is updated based on both the losses. (Document 1: Volodymyr Mnih, Adria Puigdomenech Badia, Mehdi Mirza, Alex Graves, Timothy P. Lillicrap, Tim Harley, David Silver, Koray Kavukcuoglu, "Asynchronous Methods for Deep Reinforcement Learning" and ICML2016.)

First, according to the methods disclosed in Document 1, the loss of the value outputs is calculated by using a value (Advantage) considering the behavior up to an optional k steps. The loss used to learn the value output is given by Equation (5).

$$\nabla_\theta \log \pi_\theta(a_t|s_t)A(s_t,a_t) \quad (5)$$

Here, $s_t$ is the state at time t, at is the policy (action) at time t, $\pi_\theta(a_t|s_t)$ is the policy output in a state in network θ of the policy output, and $A(s_t,a_t)$ is Advantage. An Advantage considering up to k steps ahead is calculated by Equation (6).

$$A(s,a)=\Sigma_{i=0}^{k-1}\gamma^i r_{t+i}+\gamma^k V_\varphi(s_{t+k})-V_\varphi(s_t) \quad (6)$$

Here, $\gamma$ is the discount rate, $r_t$ is the reward at time t, and $V_\varphi(s_t)$ is the value output at state. In the present embodiment, the Advantage considers the behavior up to two steps ahead, using k=2, which is common to use. Also, Equation (7) to which an entropy term is added for avoiding falling into local solutions is used in the loss of the policy function.

$$\nabla_\theta \log \pi_\theta(a_t|s_t)(R_t-V_\varphi(s_t))-\beta\nabla_\theta H(\pi_\theta(s_t)) \quad (7)$$

Here, $\beta$ is an appropriate coefficient, $H(\pi_t(s_t))$ is entropy, and $R_t$ is a value calculated by the following pseudocode.

```
Set R = 0 for terminal s_t or R = V_φ(s_t) for non-terminal
For t = t-1 to 0 do
    R = r_t + γR
End do
```

With respect to the two losses of value output and policy output calculated as described above, the weighted sum with appropriate weights is calculated to calculate a final loss. Based on this final loss, the updating unit 2009 updates the network.

As described above, according to the first embodiment, the weight parameter learned by the reinforcement learning is applied to the neural network, and a PTZ command is generated by using the neural network. Thus, it is possible to detect a target with a better detection reliability and execute tracking while performing automatic tracking capturing of the set target.

(Modifications)

In the first embodiment, reinforcement learning is performed by simulating movement and object detection of people and a ball based on a sports competition in a virtual environment and calculating scores of tracking capture and tracking. The simulation carried out here uses object detection results of multiple objects moving dynamically, and the learning of the control for tracking capture and tracking is the purpose, and it is not a perfect simulation of human and ball movements and object detection of the real environment.

Therefore, in order to compensate for this difference, it is considered that learning on a real environment is also performed to improve the robustness of the runtime processing in the real environment. Note that the configuration and operation of the apparatus at runtime is the same as in the first embodiment, so description thereof is omitted.

<Apparatus Configuration>

Figure 5:
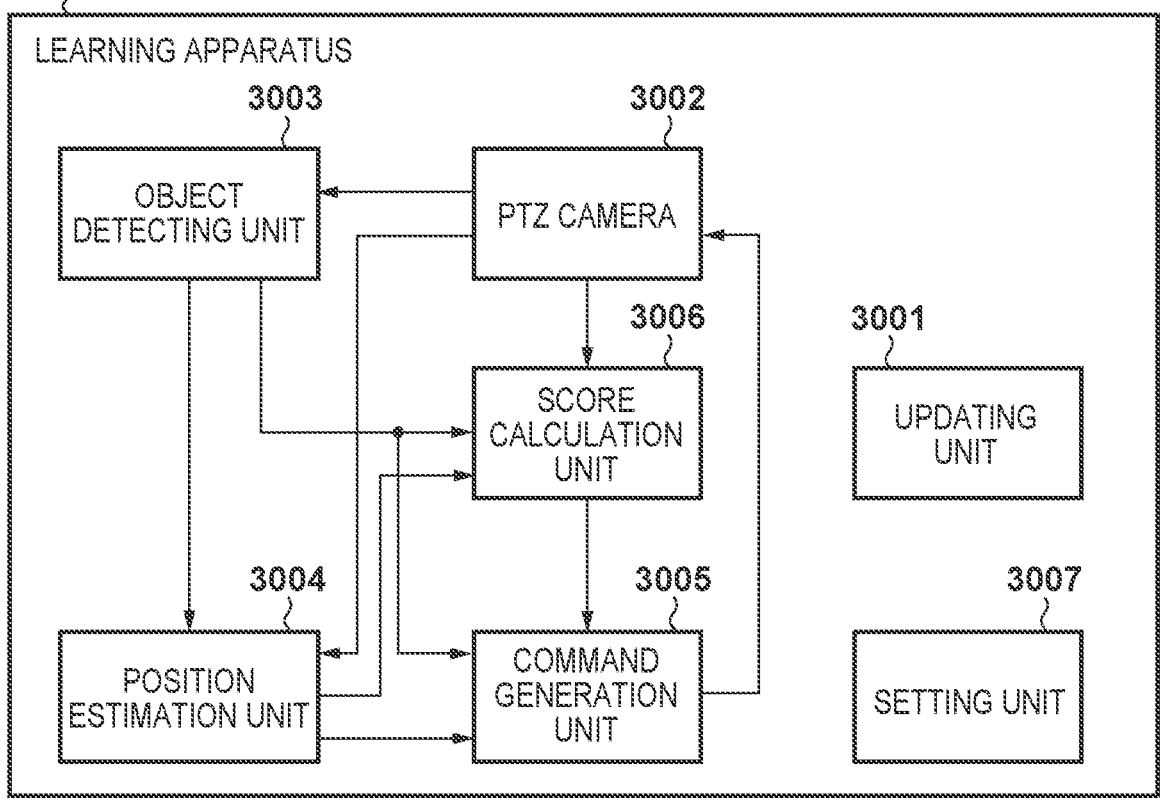
FIG. 5 is a block diagram illustrating a functional configuration example of the learning apparatus.

FIG. 5 is a view illustrating a functional configuration of a modification at the time of learning on the real environment. A learning apparatus 3000 includes an updating unit 3001, a PTZ camera 3002, an object detecting unit 3003, a position estimation unit 3004, a command generation unit 3005, a score calculation unit 3006, and a setting unit 3007. Note, the PTZ camera 3002 may be located outside the learning apparatus 3000.

That is, the estimation result of the movement and position of the object simulated by the simulation unit 2001 in the first embodiment, the second embodiment is mainly different in that it is replaced with the result estimated from the image of the actual subject in the futsal match. Note, for the futsal game, the arrangement of cameras and the positioning of the players and the ball shown in the FIG. 1A are the same, but is a futsal game performed in a real environment.

<Apparatus Operation>

<Processing During Learning>

The operation of the apparatus at the time of learning according to the modification differs in that images of actual futsal matches are used in step S2003, but the other steps are the same as in the first embodiment. Therefore, each step included in step S2003 will be described below.

In step S3001, the command generation unit 3005 generates a control command and drives panning, tilting, and zooming of the PTZ camera 3002. In this present variation, except that the PTZ camera 3002 is a real PTZ camera, the processing is the same as the pan, tilt, and zoom drive of the imaging unit 2002 of the learning unit 2100.

In step S3002, the PTZ camera 3002 obtains time-series captured images of the futsal game. Incidentally, the futsal game is a futsal game that is actually played, so the video is inputted based on the progress of real time.

In step S3003, the object detecting unit 3003 performs object detection on the image obtained by the PTZ camera 3002. This process is the same as in step S1003 at the runtime of the first embodiment.

In step S3004, the position estimation unit 3004 estimates the three-dimensional position of the tracking capture target and the tracking target based on the object detection result of step S3003 and the camera parameters of the PTZ camera 3002. This process is the same as in step S1004 at runtime of the first embodiment.

In step S3005, the score calculation unit 3006 calculates a score based on the tracking capture target and the tracking target and the states of the PTZ cameras 3002. This process is substantially the same as in step S3005 at the time of learning of the first embodiment. However, it differs in that the detection result of a real image rather than the simulation is used and a three-dimensional position estimation result based on the detection result is used.

As described above, according to the modification, learning is performed in the real environment. This makes it possible to further improve the robustness of the runtime processing in the real environment.

Second Embodiment

In the first embodiment described above, one object is handled as the tracking capture target, and a plurality of objects are envisioned as the tracking targets. However, if a plurality of objects can be set as tracking capture targets, automatic capturing for tracking each of the players playing the sport becomes possible, and there are more applications therefor. Therefore, in the second embodiment, a description will be given of a mode in which all players and the ball are tracking captured, and all players and the ball are tracked for a futsal game.

<System Configuration>

The system of the second embodiment is substantially the same as the system of the first embodiment (FIG. 1A). That is, four PTZ cameras (the cameras 101 to 104) are positioned around a futsal pitch 109. There is one ball S0 and a total of 10 players A0 to A4 and B0 to B4 in the pitch. Note that in the following description, four PTZ cameras (the cameras 101 to 104) are referred to as physical PTZ cameras. Also, one physical PTZ camera includes a plurality of virtual image capturing units (virtual camera).

Figure 6:
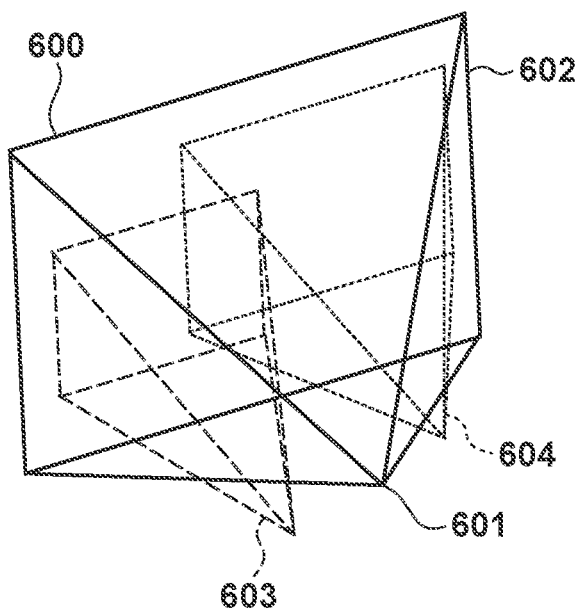
FIG. 6 is a view for describing the relationship between a physical camera and a virtual camera.

FIG. 6 is a view for describing the relationship between a physical PTZ camera and two virtual cameras. A physical PTZ camera 600 is represented by an optical center 601 and an image plane 602. Virtual cameras 603 and 604 included in the physical PTZ camera 600 are also exemplarily shown. The optical axis of the virtual camera is parallel to the optical axis of the physical PTZ camera, and the image plane is included in the image plane of the physical PTZ camera in principle.

That is, the virtual camera is a camera that can move in parallel with the image plane and can zoom, taking a partial region in the image plane of the physical PTZ camera as an image capturing target. Each physical PTZ camera contains a virtual camera corresponding to the number of tracking capture targets to be set in step S4001 described later. Each virtual camera can be controlled independently of other virtual cameras.

<Apparatus Configuration>

Figure 7A:
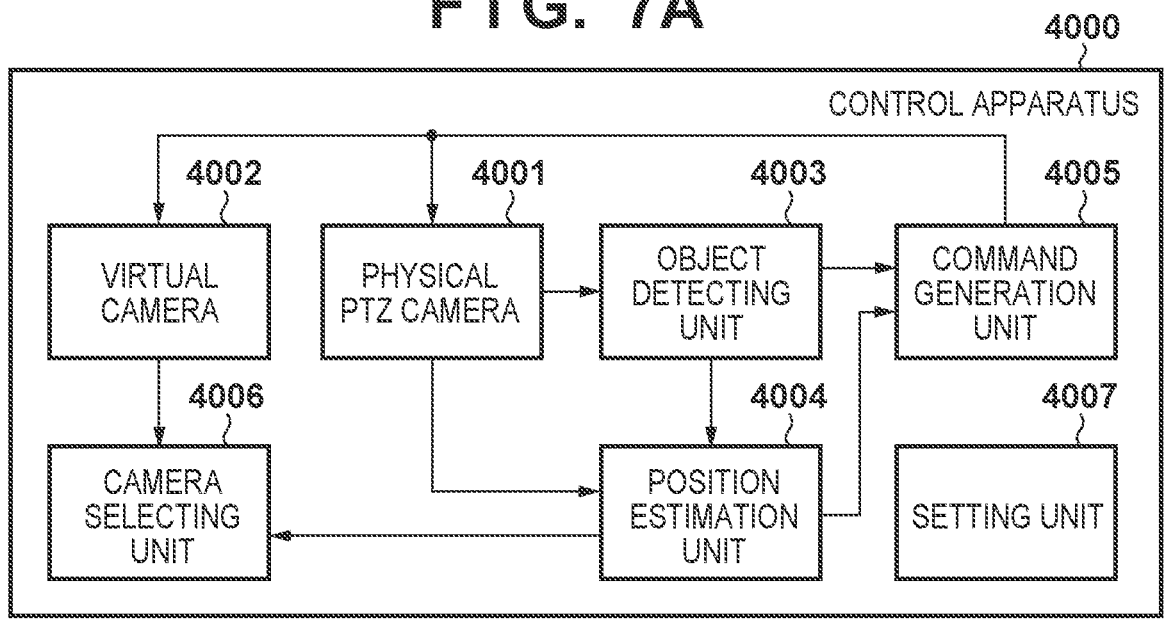
FIG. 7A and FIG. 7B are block diagrams illustrating a functional configuration example of a control apparatus.
Figure 7B:
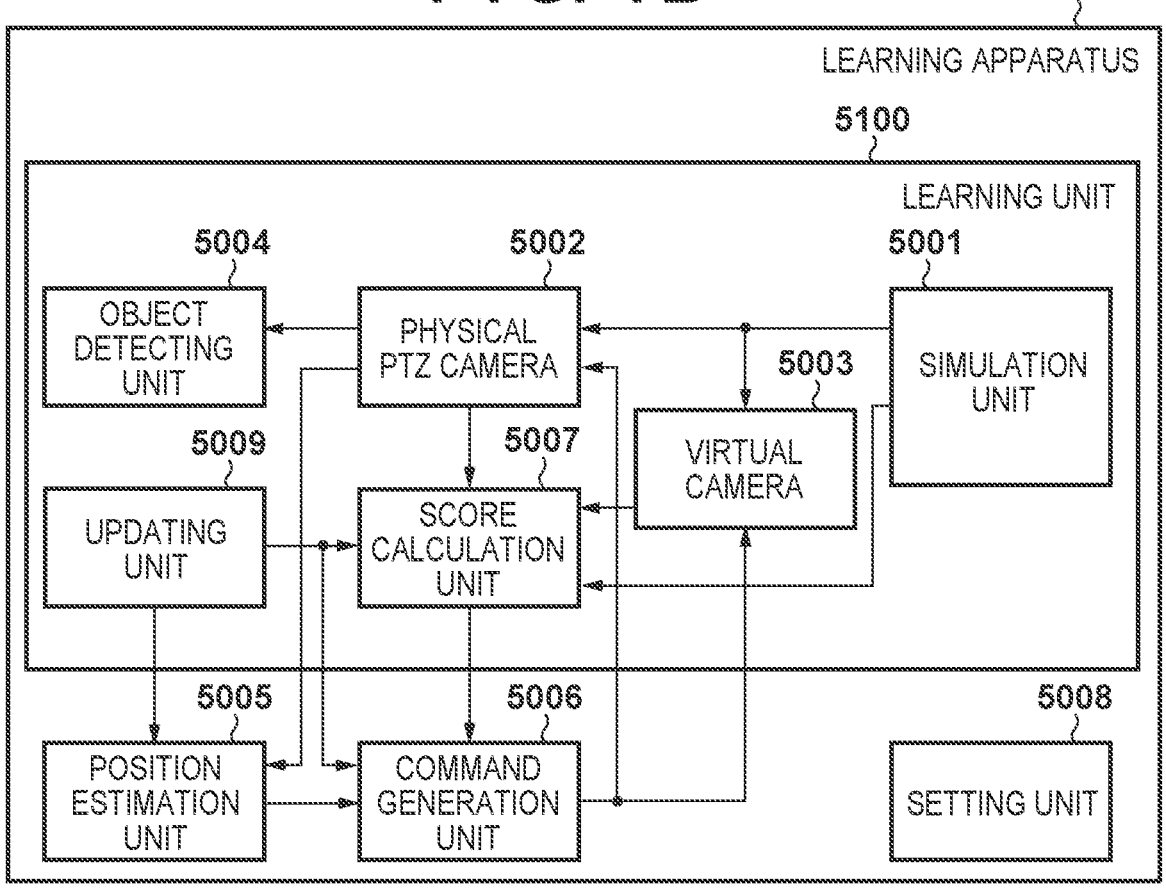

FIG. 7A is a view illustrating a functional configuration of the apparatus in the second embodiment at runtime. FIG. 7B is a view illustrating a functional configuration of the apparatus in the second embodiment at the time of learning.

A control apparatus 4000 includes a physical PTZ camera 4001, a virtual camera 4002, an object detecting unit 4003, a position estimation unit 4004, a command generation unit 4005, a camera selecting unit 4006, and a setting unit 4007. The physical PTZ camera 4001 has a different name, but is the same as the imaging unit 1001 of the first embodiment. Further, a learning apparatus 5000 includes a simulation environment 5100, a position estimation unit 5005, a command generation unit 5006, and a score calculation unit 5007. A simulation environment 5100 includes a simulation unit 5001, a physical PTZ camera 5002, a virtual camera 5003, and an object detecting unit 5004. The physical PTZ camera 5002 has a different name, but is the same as the imaging unit 2002 of the first embodiment.

<Apparatus Operation>
<Runtime Processing>

FIG. 8A is a flow chart showing a runtime process in the second embodiment. Hereinafter, portions differing from those of the first embodiment (FIG. 3B) are mainly described.

In step S4001, the setting unit 4007 sets the tracking capture and tracking targets in the same manner as in step S1001. However, in the present embodiment, it is assumed that a plurality of targets can be set as the targets of the tracking capture. An ID is assigned to each of the tracking capture and tracking target candidate instances, and it is assumed that the tracking capture and tracking target targets set here can be specified using IDs.

In step S4002, similarly to step S1002, the command generation unit 4005 performs PTZ driving of the physical PTZ camera 4001 (the cameras 101 to 104) to bring it into an initial state. In addition, the virtual camera 4002 is initialized. In this process, only the number of tracking capture targets (M: M is an integer equal to or greater than 2), in which the virtual cameras are set to the respective physical PTZ cameras in step S4001, are generated and initialized. For example, in a case where 11 instances (one ball and 10 players) are to be tracking capture targets, one camera has 11 virtual cameras and is initialized here. The initialization of the virtual cameras is performed in the same manner as in the physical PTZ camera.

A loop L4001 is a time related loop, and is the same as L1001 of the first embodiment, and therefore the description thereof is omitted.

In step S4003, the object detecting unit 4003 resizes the image obtained from the physical PTZ camera 4001 to an appropriate size and executes a detection process similarly to step S1003.

In step S4004, the position estimation unit 4004 performs three-dimensional position estimation and allocation of IDs for the respective targets, similarly to step S1004. This ID is further assigned to the ID of the tracking capture target set in step S4001. As a result, the ID of the tracking target is assigned to the detection result obtained in step S4003.

In step S4005, the command generation unit 1004 estimates the control commands of the physical PTZ camera 4001 and the virtual camera 4002. In the present embodiment, it is assumed that the same Actor-Critic network 400 (FIG. 4A) as in the first embodiment is used for estimating the PTZ commands for the physical PTZ cameras 4001, and the same inputs and outputs as in the first embodiment are used. That is, a PTZ command is outputted from the policy output 404. On the other hand, in order to estimate control commands for the virtual cameras, the Actor-Critic network 900 of FIG. 9A is used.

Figure 9A:
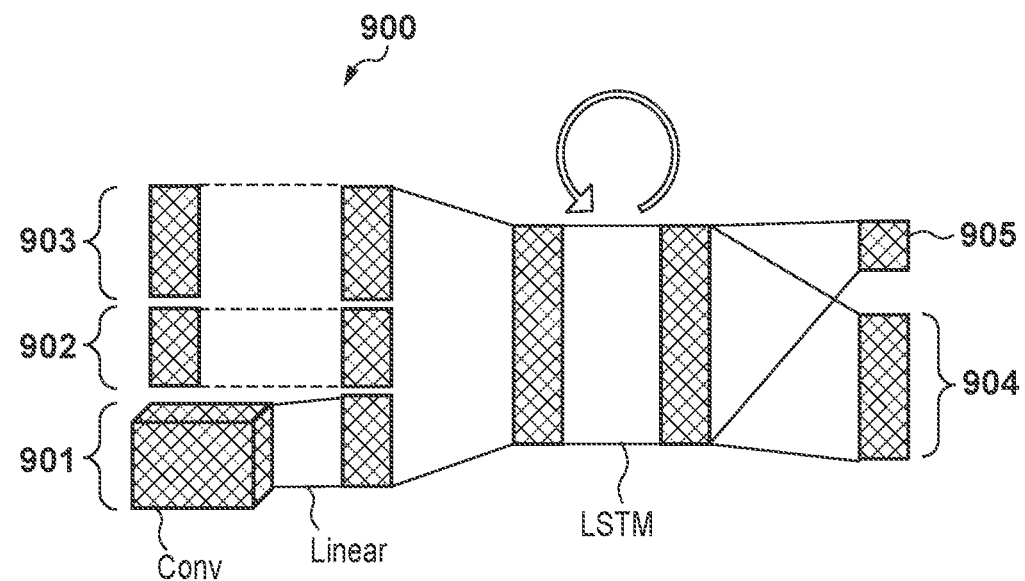
FIG. 9A and FIG. 9B are views illustrating a configuration example of a learning model.

FIG. 9A is a view illustrating a configuration of a virtual camera Actor-Critic network. As described with reference to FIG. 6, in the tracking capture of the present embodiment, the Actor-Critic network cuts out the image of the virtual camera from the image of the physical PTZ camera. Since the size of the region of the extraction source is the number of pixels as it is, it is assumed that zooming of the virtual camera is limited and the size of the region of the extraction source is limited to be equal to or larger than a certain value for the purpose of maintaining the image quality at the viewing level.

The virtual camera can also move in the image plane of the physical PTZ camera to which the camera belongs. The image plane in which the virtual camera moves shall be a space with the image center as the origin, horizontal right direction as +u, and vertical upward direction as +v. However, since the image plane of the virtual camera does not protrude from the image plane of the physical PTZ camera, and the virtual camera has a state of zoom above a certain level, the state (u, v) does not reach the edge of the space.

The behavior space of the virtual camera is three-dimensional in these {u, v, Z} dimensions, and the policy output 904 of the Actor-Critic network 900 is control command (uvZ command) in this behavior space.

The network 900 inputs the image 901, the three-dimensional position 902 of the tracking capture target assigned to the virtual camera, u, v of the virtual camera, the state of zooming, the orientation of the physical PTZ camera that the virtual camera has, and the state 403 of pan, tilt, and zoom.

Figure 9B:
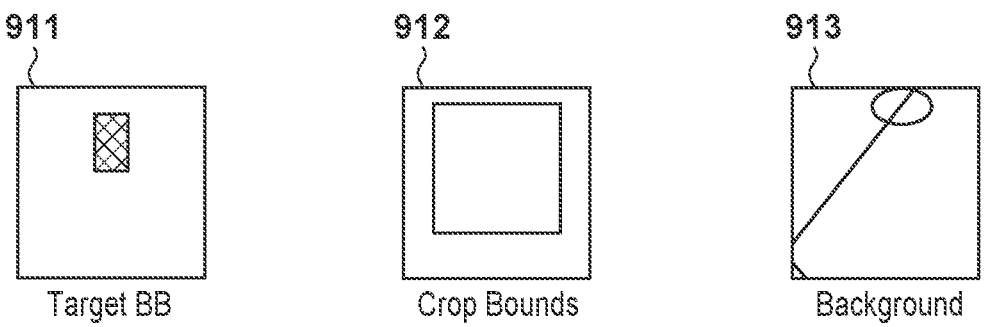

The image 901 is assumed to be a three-channel image as shown in an input image 910 of FIG. 9B. Specifically, an image 911 of the first channel is an image of the bounding box to which the ID of the tracking capture target is assigned among the detection results of the image of the physical PTZ camera to which the virtual camera belongs. Further, an image 912 of the second channel is a boundary of the cut-out region, and an image 913 of the third channel is an image in which the background is binarized.

As described above, the policy output 904 is a control command for {u, v, Z}. It is assumed that command generates a command with a continuous value of [−1, 1] in the same manner as the policy outputs 404 of the Actor-Critic network 400 of the first embodiment.

The value output 905 outputs a value corresponding to the command of the policy output 904, but this output is not used in the processing at the runtime similarly to the first embodiment. Note that, although a mode in which networks that are subjected to reinforcement learning by the Actor-Critic method are used is described here, another reinforcement learning method such as Q-learning may be applied.

In step S4006, the command generation unit 4005 transmits the PTZ command generated in step S4005 to the physical PTZ camera 5002 (cameras 101 to 104) and executes PTZ driving of the cameras. Further, the generated control command is transmitted to the corresponding virtual camera to drive the virtual camera (uvZ driving). The PTZ driving is performed within a predetermined driving range of the PTZ camera similarly to the first embodiment. The uvZ driving of the virtual camera is similarly performed within a predetermined driving range.

In step S4007, the camera selecting unit 4006 performs a process of selecting the most suitable cut-out image from the cut-out images of the virtual cameras having the same IDs, which are present in the four physical PTZ cameras. The selection standard may be the same as the score of the tracking capture described in the first embodiment. That is, since the distance from the center of the screen and the size of the visible part can be scored by using the score relating to the cosine similarity and the size of the visible part, the cut-out image is selected based on the scores. Here, as the three-dimensional position of the tracking capture target used for calculation of the scores and values estimated in step S4004 are used. In addition, in order to prevent frequent screen switching, the virtual camera ID selected by processing such as moving average may be smoothed.

This processing is performed on all tracking capture targets, and the cut-out images of all tracking capture targets are obtained. The cut-out image is then subjected to post-processing such as resizing and the like to be viewed.

<Processing During Learning>

Since the process at the time of learning is substantially the same as that of the first embodiment, the part differing from that of the first embodiment will be mainly described referring to the flowcharts of the FIG. 3B and FIG. 3C.

in step S2001, the setting unit 5008 sets the plurality of targets for which to perform tracking capture and sets the tracking target. An ID is assigned to each of the tracking capture and tracking target candidate instances, and it is assumed that the tracking capture and tracking target targets set here can be specified using IDs. In addition, similarly to the first embodiment, parameters related to the standard of the tracking capture are set.

In step S2002, the setting unit 5008 performs initialization of the virtual cameras in addition to the initialization similar to that of the first embodiment. That is, the virtual camera 5003 of the simulation environment 5100 is instantiated and initialized.

In step S2003, the simulation unit 5001 updates the simulation environment. In step S3001, besides PTZ driving of the physical PTZ camera 5002, uvZ driving of the virtual camera 5003 is performed. In step S3004, the tracking capture and the estimation of the three-dimensional position of the tracking target and the allocation of the IDs are performed. Further, it is assumed that the ID here is associated with the ID of the tracking target and the ID of the tracking target set in step S2001. In step S3005, similarly to the first embodiment, the scores of the tracking capture and the tracking are calculated.

However, as described above, in the present embodiment, a plurality of tracking capture targets are set. Therefore, the score of the tracking capture is calculated for each of the one or more virtual cameras 5003 included in the physical PTZ camera 5002 regarding the image capturing target assigned to each virtual camera.

As for the tracking capture score, similarly to the first embodiment, the distance from the center of the screen is scored using Equation (1). Further, when a range is set with respect to the size of the visible part, scoring with respect to the size may be performed by using the relative size with respect to the cut-out image. When the object is outside the FOV of the virtual camera, similarly to the first embodiment, the tracking capture score may be set to 0 (Equation (2)). The tracking capture scores of a certain target obtained here are used as rewards for the corresponding virtual cameras in the reinforcement learning (learning corresponding to the virtual cameras) of the networks 900 in step S2006 described later.

In the present embodiment, the tracking capture score of each tracking capture target is calculated by each of the four cameras. The maximum value of the four tracking capture scores for a target is obtained, and the maximum value is used as the tracking capture score for the target. Further, the scores of all the tracking capture targets are averaged to obtain an overall tracking capture score. The tracking score is calculated in the same manner as in the first embodiment.

Finally, an integrated score obtained by averaging the entire tracking capture score and the tracking score is obtained by using Equation (4). Then, the integrated score is set as a reward used in the reinforcement learning (learning corresponding to the physical PTZ camera) of the network 400.

In step S2006, the command generation unit 2005 updates the network 400 with the obtained integrated score as a reward. In addition, the network 900 is updated using the tracking capture score for each virtual camera as a reward.

As described above, according to the second embodiment, a plurality of tracking capture targets are set. This makes it possible to ideally perform at the same time/in parallel two tasks: the obtainment of the automatic capturing video and the obtainment of the tracking data, for all the set tracking capture targets.

Third Embodiment

In the third embodiment, an embodiment applied to free viewpoint video generation will be described. More specifically, the creation of a three-dimensional shape model using the visual volume intersection method (Visual Hull), and an image capturing system for performing capturing and tracking at the same time/in parallel is described. That is, in the first and second embodiments, a moving image based on a captured image is output, while in the third embodiment, a moving image including a generated free viewpoint video is output.

In the visual volume intersection method, one instance is captured by multiple cameras arranged around the pitch, and the foreground mask of multiple viewpoints is used, and the reconstruction of the three-dimensional shape model of the subject is carried out. In the camera control using the reinforcement learning described in the present embodiment, optimal control is performed for capturing images of all instances with more pixels and a set number of viewpoints or more. Thereby, efficient three-dimensional shape model generation is realized. In addition, since the ball and all players moving within the pitch are captured, according to the method of the present embodiment, a limited number of cameras can be efficiently controlled, and a uniform free viewpoint video can be generated throughout the pitch.

Hereinafter, similarly to the first and second embodiments, a futsal image capturing will be described as a target.

<System Configuration>

Figure 10:
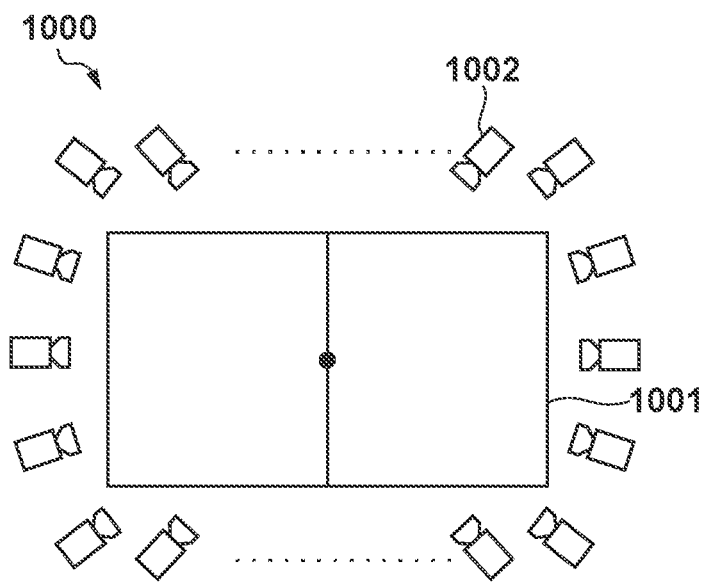
FIG. 10 is a view illustrating an arrangement example of cameras.

FIG. 10 is a view illustrating an example of positioning of cameras in the third embodiment. A camera arrangement 1000 illustrates placement of the plurality of cameras 1002. Hereinafter, the number of cameras is assumed to be K.

The K cameras 1002 are fixedly installed PTZ cameras that can be driven to pan, tilt, and zoom by external commands. A rectangle 1001 is an outer circumference of the futsal pitch. Each camera is installed on the same plane with almost the same height from the ground. Each camera is calibrated in the initial state, and it is assumed that the orientations can be accurately estimated based on the amount of a change of the internal state, 9-axis sensors (acceleration/gyro/geomagnetic sensor), images, and the like even if driving of the PTZ occurs.

<Apparatus Configuration>

Figure 11:
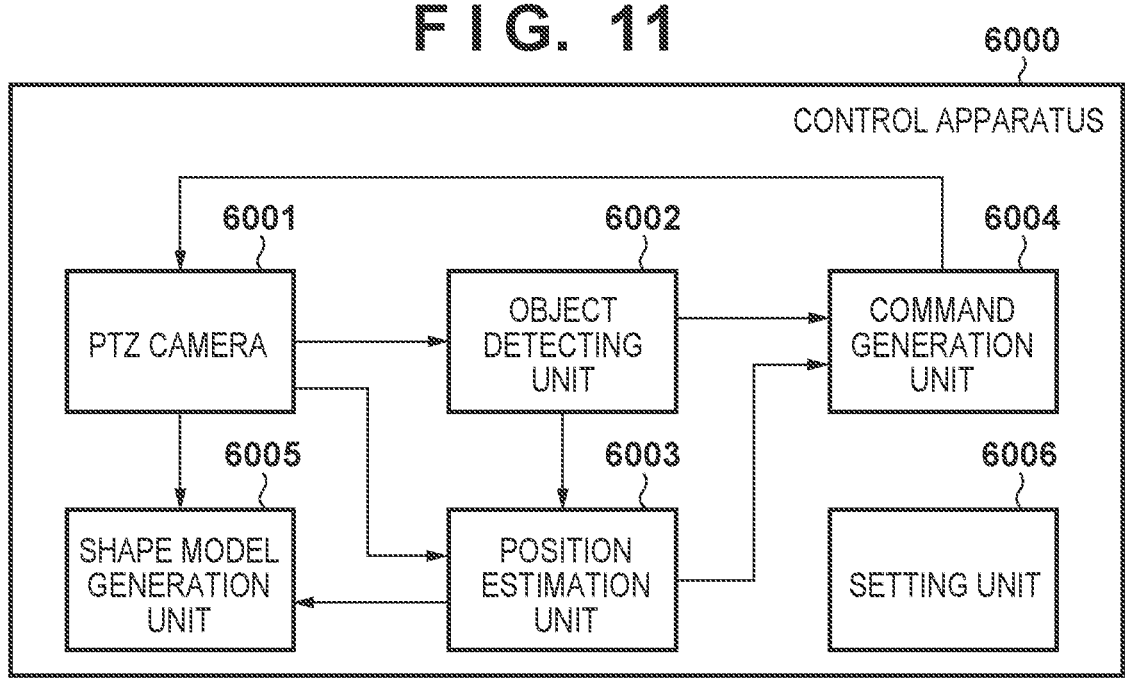
FIG. 11 is a block diagram illustrating a functional configuration example of the control apparatus.

FIG. 11 is a view illustrating a functional configuration of the apparatus in the third embodiment at runtime. A control apparatus 6000 includes a PTZ camera 6001, an object detecting unit 6002, a position estimation unit 6003, a command generation unit 6004, a shape model generation unit 6005, and a setting unit 6006. Note, the functional configuration of the apparatus at the time of learning is the same as that of the first embodiment (FIG. 2B).

<Apparatus Operation>
<Runtime Processing>

FIG. 8A is a flow chart showing a runtime process in the third embodiment. In steps S6002, L6001, L6002, S6003, S6004, S6006, and S6007, the same process as in the first embodiment (FIG. 3A) is performed on the number of cameras K. Hereinafter, portions differing from those of the first embodiment will be mainly described.

In step S6001, the setting unit 6006 sets the target object to perform tracking capture and tracking. Also, in applying the visual volume intersection method, the lower limit $K_v$ of the number of cameras to capture one instance is set. Since the total number of cameras is K as described above, an integer satisfying $2 \leq K_v \leq K$ is set here.

In step S6005, the shape model generation unit 6005 creates a foreground mask for K images obtained by K PTZ cameras and sets a region label in the foreground region of each image. Then, the visual volume intersection method is applied to the foreground region of each image to generate a three-dimensional shape model of the subject. As post-processing, noise may be further removed by using the size of the three-dimensional shape model, tracking information obtained in step S6004, and the like. The tracking information may be used to associate IDs with each three-dimensional shape model.

<Processing During Learning>

The process at the time of learning is the same as that of the first embodiment except that the number of cameras is K except for step S3005. Hereinafter, referring to flowcharts of FIG. 3B and FIG. 3C, the process of step S3005 differing from that of the first embodiment will be described.

In step S3005, the learning unit 2100 calculates three scores and finally averages them to obtain an integrated score. Here, the three scores are a tracking capture score, a tracking score, and a score indicating a degree of adaptability to model generation by the visual volume intersection method (hereinafter referred to as a model creation score). Note, since the two tracking capture scores and tracking scores are the same as in the first embodiment, a description thereof will be omitted.

There is a restriction on the number of cameras that will capture by $K_v$ or more for a given instance in the model creation score. An angle score and a magnitude score are calculated, respectively, to obtain a final model creation score.

Angle Score

Figure 12:
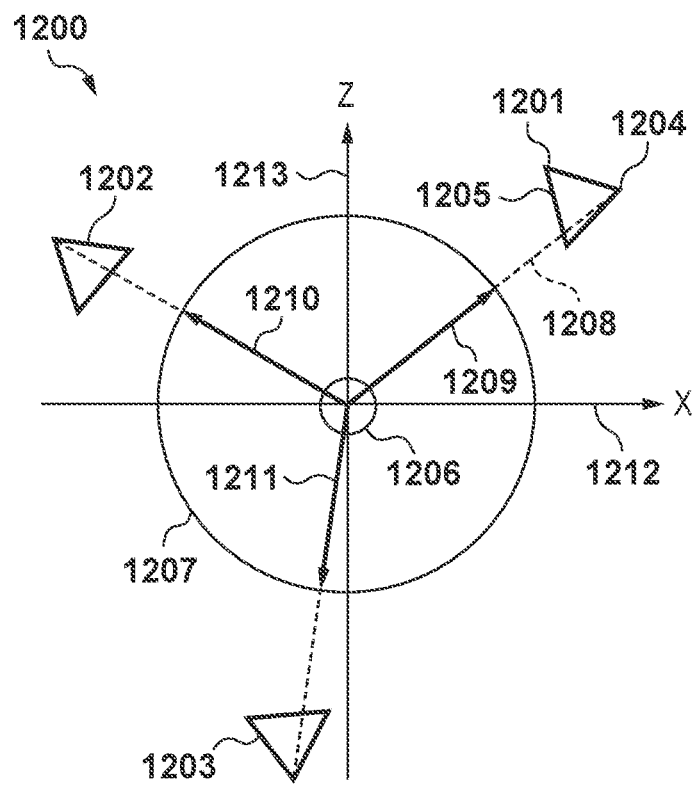
FIG. 12 is a view for describing an angle score.

FIG. 12 is a view for describing an angle score. Triangles 1201, 1202, and 1203 represent cameras, respectively. An apex 1204 of the triangle represents the optical center of the camera represented by the triangle 1201, and a base 1205 represents the image plane of the camera represented by the triangle 1201. A circle 1206 is an instance to be subjected to three-dimensional shape model generation.

The axes 1212 and 1213 are the x-axis and the z-axis when the instance is the origin, and the plane parallel to the x-axis and the z-axis is the ground. Since each PTZ camera is coplanar as described above, the angle score is calculated in two dimensions parallel to the ground as shown in this figure.

A circle 1207 is a unit circle of xz coordinates, and a dotted line 1208 is the line of sight from the optical center of the camera (apex 1204) to the instance (circle 1206). An arrow 1209 is a unit vector from the instance to the optical center direction. Similarly, arrows 1210 and 1211 are unit vectors toward the optical center of the two cameras corresponding to the triangles 1202 and 1203.

In the free viewpoint video generation, the three-dimensional shape model is generated by the visual volume intersection method, and furthermore, the image is made to be a texture of the three-dimensional shape model. Therefore, when capturing an instance from a plurality of viewpoints, it is desirable that the angles from the instance to each viewpoint be equal. In other words, it is better that the magnitude of the sum of the unit vectors 1209, 1210, and 1211 from the instance to the optical center direction of each viewpoint is closer to 0. Therefore, it can be expressed as Equation (8).

$$r_n^a = 1 - \left\| \frac{1}{K_v} \sum_k v_k \right\| \tag{8}$$

Here, $K_v$ is the number of viewpoints, $v_k$ is the unit vector from the instance to each camera, and $\|\cdot\|$ is the Euclidean distance. When a certain instance is captured from $K_v$ or more viewpoints, $K_v$ vectors in which the sum of the absolute values of the angle differences between the vectors is the largest are taken and set as $v_k$. This is because, in a case where a combination, in which the score of Equation (8) with $K_v$ vectors is high, can be realized, even if there are more vectors than $K_v$, there is no adverse effect on the generation of the three-dimensional shape model.

Size Score

The magnitude score may be calculated as in Equation (9). $f(x_k)$ is a function that outputs a value close to 1 when the size of the visible part of the instance is within the appropriate range, and a value close to 0 when it is outside the range.

$$r_n^b = \frac{1}{K_v} \sum_k f(x_k) \tag{9}$$

Here, $x_k$ is the magnitude of the visible part relating to the $v_k$ instance of Equation (8). That is, the magnitude score is a score that is close to 1 in a case where the visible part from each viewpoint is within an appropriate range by calculating $f(x_k)$ and taking an average for each viewpoint.

Ultimately, the three-dimensional model creation score of an instance is expressed by Equation (10) when the number of viewpoints to be captured is $N_v$ or more.

$$r_n^c = (r_n^a + r_n^b)/2 \tag{10}$$

On the other hand, in a case where the number of viewpoints to be captured is less than Nv, Equation (11) is obtained.

$$r_n^c = 0 \tag{11}$$

Further, a value averaged over all instances is used as a final three-dimensional model creation score (Equation (12)).

$$r_3 = \frac{1}{N} \sum_n r_n^C \tag{12}$$

Finally, a value obtained by averaging the tracking capture score, the tracking score, and the three-dimensional model creation score, which are calculated in the same manner as in the first embodiment, is used as the integrated score.

As described above, according to the third embodiment, in addition to capturing and tracking, generation of a three-dimensional shape model using the visual volume intersection method is performed in parallel. By this, automatic control of a plurality of cameras for performing more efficient free viewpoint video generation becomes possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-168658, filed Oct. 5, 2020 which is hereby incorporated by reference herein in its entirety.

What is claimed is:

1. A control apparatus that controls one or more image capturing units, the apparatus comprising:
   at least one memory storing instructions; and
   at least one processor that, upon execution of the instructions, is configured to operate as a plurality of units comprising:
   (1) an obtaining unit configured to, based on an image of a plurality of objects captured by the image capturing units, obtain positions of the plurality of objects; and
   (2) a generation unit configured to generate a control command for changing an orientation of at least one of the image capturing units based on a score calculated based on (a) a reliability in tracking of the plurality of objects, (b) the positions of the plurality of objects, and (c) orientations of the image capturing units,
   wherein the generation unit generates the control command such that the score, which includes (a) a first score based on a first criterion regarding an accuracy of a tracking capture of one or more target objects included in the plurality of objects and (b) a second score based on a second criterion regarding a reliability in the tracking of the plurality of objects, becomes relatively larger.

2. The control apparatus according to claim 1, wherein the first criterion includes at least one of (a) a distance from the center of the image of the plurality of objects and (b) a size of the plurality of objects in the image, and
   wherein the second criterion includes at least one of (a) a rate of occurrence of occlusion in a plurality of objects, (b) a size of the plurality of objects in the image, and (c) a rate of occurrence and a movement velocity in the image of the plurality of objects.

3. The control apparatus according to claim 1, wherein the plurality of units further comprises a model generation unit configured to generate a shape model of a subject based on the image, and
   wherein the generation unit, based on (a) the image, (b) the positions of the plurality of objects, and (c) the orientations of the image capturing units, further calculates a third score based on a third criterion which indicates a degree of adaptability to generation of a three-dimensional shape model, and generates the control command such that a score determined based on the first score, the second score, and the third score becomes relatively larger.

4. The control apparatus according to claim 1, wherein the generation unit generates, as the control command, control information for changing the orientation of the image capturing units, which is obtained by inputting the image and the positions of the plurality of objects into a learning model to which a given weighting parameter is applied, and
   wherein the given weighting parameter is generated by reinforcement learning performed using the score when the image, the positions of the plurality of objects, and the orientation of the image capturing units are inputted to the learning model as a reward.

5. The control apparatus according to claim 1, wherein the image capturing unit captures a field in which a ball sport is played, and
   wherein the plurality of objects are a ball and/or a player closest to a ball in a three-dimensional position.

6. The control apparatus according to claim 1, wherein a number of the plurality of objects is M (where M is an integer of two or more),
wherein the control apparatus is configured to connect with M virtual image capturing units for each partial region of the image to be the image capturing targets, and
wherein the M virtual image capturing units are configured so as to track the M target objects.

7. The control apparatus according to claim 1, wherein the one or more image capturing units are configured to be capable of controlling at least one of pan, tilt, and zoom (PTZ), and
wherein the control command is a command for driving at least one of PTZ.

8. A control method of a control apparatus that controls one or more image capturing units, the control method comprising:
obtaining, based on an image of a plurality of objects captured by the image capturing units, positions of a plurality of objects; and
generating a control command for changing an orientation of at least one of the image capturing units based on a score calculated based on (a) a reliability in tracking of the plurality of objects, (b) the positions of the plurality of objects, and (c) orientations of the image capturing units,
wherein the control command is generated in the generating such that the score, which includes (a) a first score based on a first criterion regarding an accuracy of a tracking capture of one or more target objects included in the plurality of objects and (b) a second score based on a second criterion regarding a reliability in the tracking of the plurality of objects, becomes relatively larger.

9. A non-transitory computer-readable recording medium storing a program for causing a computer to execute a control method of a control apparatus that controls one or more image capturing units, the control method comprising:
obtaining, based on an image of a plurality of objects captured by the image capturing units, positions of a plurality of objects; and
generating a control command for changing an orientation of at least one of the image capturing units based on a score calculated based on (a) a reliability in tracking of the plurality of objects, (b) the positions of the plurality of objects, and (c) orientations of the image capturing units,
wherein the control command is generated in the generating such that the score, which includes (a) a first score based on a first criterion regarding an accuracy of a tracking capture of one or more target objects included in the plurality of objects and (b) a second score based on a second criterion regarding a reliability in the tracking of the plurality of objects, becomes relatively larger.

10. The control apparatus according to claim 1, wherein the generation unit obtains a higher score, as the first score, in a case where the plurality of objects are located within a center region of the image in comparison with a case where the plurality of objects are located outside the center region of the image, and
wherein the generation unit obtains a higher score, as the second score, in a case where the plurality of objects are detected from the image of one of the image capturing units in comparison with a case where the plurality of objects are detected from the image of two or more of the capturing units.

* * * * *